United States Patent
Kasslin et al.

(10) Patent No.: US 10,966,109 B2
(45) Date of Patent: Mar. 30, 2021

(54) ADAPTIVE THRESHOLD HANDLING FOR TRIGGERING WLAN OFFLOADING

(71) Applicant: Nokia Technologies Oy, Espoo (FI)

(72) Inventors: Mika Kasslin, Espoo (FI); Janne Marin, Espoo (FI); Mika Rinne, Espoo (FI); Antti Sorri, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 656 days.

(21) Appl. No.: 15/122,745

(22) PCT Filed: Mar. 24, 2014

(86) PCT No.: PCT/US2014/031624
§ 371 (c)(1),
(2) Date: Aug. 31, 2016

(87) PCT Pub. No.: WO2015/147790
PCT Pub. Date: Oct. 1, 2015

(65) Prior Publication Data
US 2017/0078905 A1 Mar. 16, 2017

(51) Int. Cl.
*H04W 4/00* (2018.01)
*H04W 24/10* (2009.01)
(Continued)

(52) U.S. Cl.
CPC ............. *H04W 24/10* (2013.01); *H04L 43/16* (2013.01); *H04W 28/08* (2013.01); *H04W 48/20* (2013.01); *H04W 48/14* (2013.01); *H04W 84/12* (2013.01)

(58) Field of Classification Search
None
See application file for complete search history.

(56) References Cited

U.S. PATENT DOCUMENTS

2011/0320588 A1 12/2011 Raleigh
2012/0196644 A1 8/2012 Scherzer et al.
(Continued)

FOREIGN PATENT DOCUMENTS

WO 2013123467 8/2013

OTHER PUBLICATIONS

International Search Report and Written Opinion received for corresponding Patent Cooperation Treaty Application No. PCT/US2014/031624, dated Dec. 2, 2014, 14 pages.
(Continued)

*Primary Examiner* — Zewdu A Beyen
(74) *Attorney, Agent, or Firm* — Nokia Technologies Oy

(57) ABSTRACT

Methods and apparatus, including computer program products, are provided for adaptation of WLAN selection thresholds. In one aspect there is provided a method, which may include receiving, at a user equipment, information including one or more thresholds for use when evaluating a selection of a wireless local area network access point for offloading; comparing, by the user equipment, a quality of an access provided by the wireless local area network access point selected in accordance with the one or more thresholds to another quality provided by a cellular access point; reporting, by the user equipment, a result of the comparing; and receiving, by the user equipment in response to the reporting, additional information including one or more adjusted thresholds for use when evaluating wireless local area network access point selection. Related systems, articles of manufacture, and the like are also disclosed.

17 Claims, 6 Drawing Sheets

(51) Int. Cl.
*H04W 48/20* (2009.01)
*H04L 12/26* (2006.01)
*H04W 28/08* (2009.01)
*H04W 48/14* (2009.01)
*H04W 84/12* (2009.01)

(56) References Cited

U.S. PATENT DOCUMENTS

2012/0324100 A1   12/2012  Tomici et al.
2013/0308489 A1   11/2013  Tomala et al.
2014/0161103 A1*  6/2014  Sirotkin ............... H04W 24/10
                                                            370/332

OTHER PUBLICATIONS

Alcatel-Lucent: "Policy based terminal triggered, ANDSF decided selection", 3GPP Draft; S2-081658 Revision of 1355 ANDSF Discussion V2, 3rd Generation Partnership Project (3GPP), Mobile Competence Centre ; 650, Route Des Lucioles ; F-06921 Sophia-Antipolis Cedex ; France, vol. SA WG2, No. Athens; Feb. 16, 2008, Feb. 16, 2008 (Feb. 16, 2008), XP050263998, [retrieved on Feb. 16, 2008].

* cited by examiner

ADAPTIVE THRESHOLD HANDLING FOR TRIGGERING WLAN OFFLOADING

RELATED APPLICATION

This application was originally filed as PCT Application No. PCT/US2014/031624 filed Mar. 24, 2014.

FIELD

The subject matter described herein relates to wireless communications.

BACKGROUND

The use of heterogeneous networks (hetnets) may provide opportunities for offloading traffic from macrocells to a typically higher speed or capacity wireless local area network (WLAN) serving for example a small cell. The heterogeneous network may include one or more wireless access points, or base stations, such as for example an E-UTRAN (evolved Universal Mobile Telecommunications System Terrestrial Radio Access Network) NodeB base station serving macrocells, and one or more small cell base stations serving small cells. For example, a small cell base station (or a wireless access point or a remote radio head) may be implemented to cover a small cell, or coverage area, examples of which include a residence, a small business, a building, an office, a small area, and/or any other area. As such, the small cell base station, such as for example a home base station (HNB), a home E-UTRAN NodeB base station (HeNB), a WiFi access point, and the like, may be configured to have some of the functionality similar to a typical base station, such as for example an E-UTRAN NodeB (eNB) base station, but the small cell base station may have less range and output power given its limited coverage area. Accordingly, wireless service providers view small cell base stations/wireless access points as a way to extend service coverage, as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

Methods and apparatus, including computer program products, are provided for adaptation of WLAN selection thresholds.

In some example embodiments, there may be provided a method, which may include receiving, at a user equipment, information including one or more thresholds for use when evaluating a selection of a wireless local area network access point for offloading; comparing, by the user equipment, a quality of an access provided by the wireless local area network access point selected in accordance with the one or more thresholds to another quality provided by a cellular access point; reporting, by the user equipment, a result of the comparing; and receiving, by the user equipment in response to the reporting, additional information including one or more adjusted thresholds for use when evaluating wireless local area network access point selection.

In some variations, one or more of the features disclosed herein including the following features can optionally be included in any feasible combination. The quality may represent a first quality of experience for one or more flows when carried via the wireless local area network access point. The other quality may represent a second quality of experience for the one or more flows when carried by the cellular access point. The first quality of experience and the second quality of experience may each represent at least one of a packet delay, a jitter, a throughput, or a packet loss. The first quality of experience and the second quality of experience may be determined on a per flow basis. The result may indicate the quality is less than an expected quality of experience threshold improvement over the other quality. The result may include at least one of the received thresholds causing the quality to be less than an expected quality of experience threshold improvement over the other quality. The one or more thresholds may be received via an access network discovery and selection function management object.

In some example embodiments, there may be provided a method, which may include sending information including one or more thresholds for use by a user equipment when evaluating a selection of a wireless local area network access point for offloading; receiving one or more feedback thresholds, when a quality of experience of an access provided by the wireless local area network access point selected in accordance with the one or more one or more thresholds is less than an expected quality of experience threshold improvement over another quality of experience provided by a cellular access point; and sending, in response to the receiving, additional information including one or more adjusted thresholds for use when evaluating wireless local area network access point selection.

In some variations, one or more of the features disclosed herein including the following features can optionally be included in any feasible combination. The quality of experience and the other quality of experience may each represent at least one of a packet delay, a jitter, a throughput, or a packet loss.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
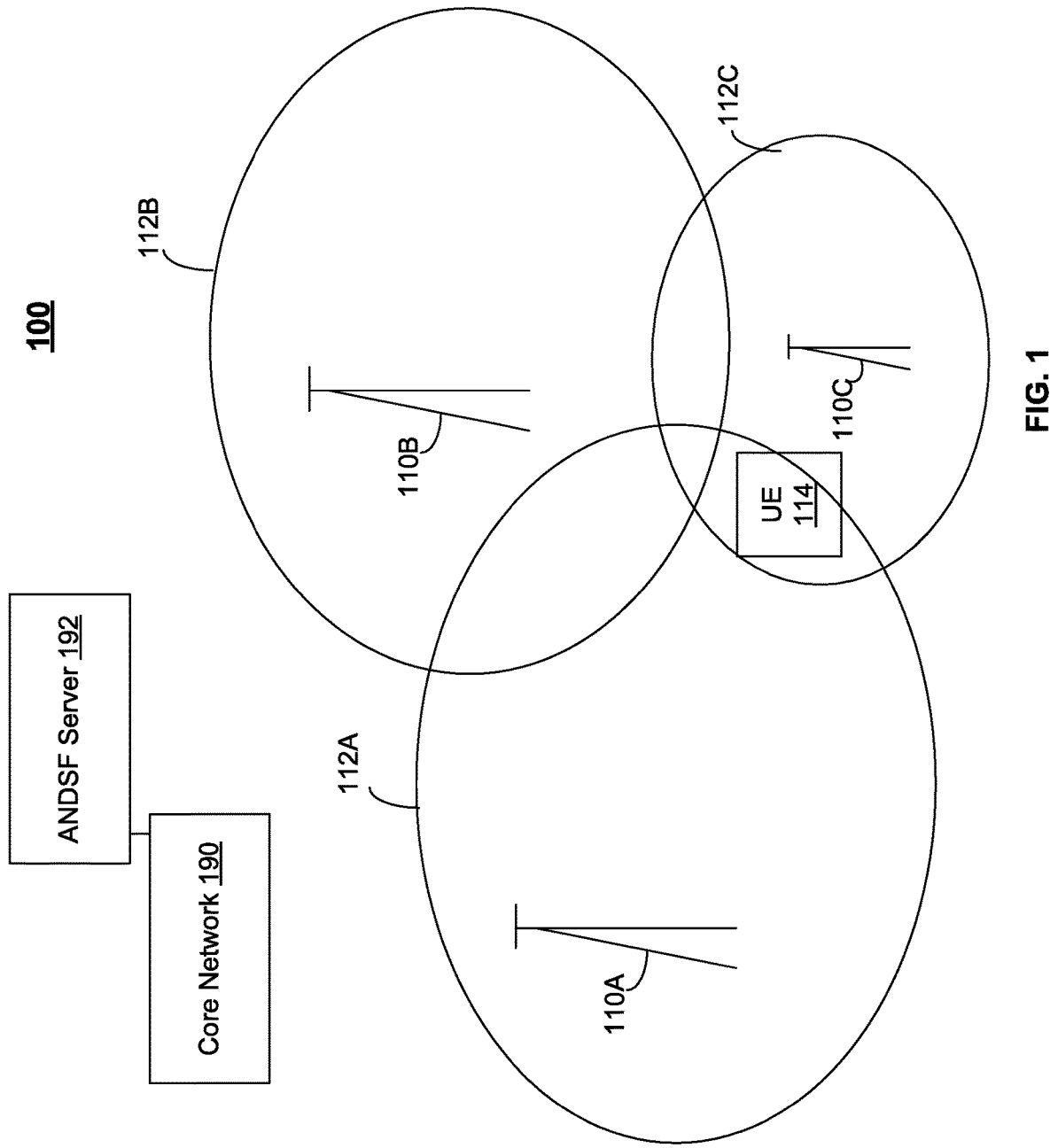
FIG. 1 depicts an example of a system, in accordance with some example embodiments.

Like labels are used to refer to same or similar items in the drawings.

DETAILED DESCRIPTION

In some example embodiments, the subject matter disclosed herein relates to radio interworking, such as the radio interworking among cellular radio access networks (for example, 3GPP radio access networks as well as other types of networks) and wireless local area networks (WLANs), and, in particular, adjusting the thresholds used to select a WLAN for offloading from a cellular radio access network (or, for example, a macrocell) to the WLAN (or, for example, a small cell). A UE in a heterogeneous network may select a WLAN based on selection thresholds. These selection thresholds may be set at certain values to enable measurements of cellular signals (for example, a signal-to-interference measurement of a macro base station, a load measure associated with the macro base station, and the like), and some of the thresholds may be set to enable measurement of one or more candidate WLANs being considered for selection and access. For example, a UE may measure reference signal received power (RSRP), reference signal received quality (RSRQ), and/or load measurements of a base station serving the UE, compare those measurements to a corresponding set of thresholds, make measurements of a WLAN access point being considered for selection and offloading, and then compare those WLAN measurements to another corresponding set of thresholds. If the comparison indicates that the WLAN is a good candidate for offloading, the WLAN may be selected, and the UE may couple to the WLAN access point, and one or more flows previously carried via the cellular base station may be routed to the WLAN access point (and these flows may be routed on a per flow, a per service, and/or a per access point network basis).

In some example embodiments, the UE may, in addition to physical radio measurements of the radio signals from the cellular base station and WLAN access point, measure a Quality of Experience (QoE) for traffic flows routed via the cellular base station/radio access network while the UE uses base station/radio access network. When the UE makes a decision per selection thresholds to select a given WLAN for offloading, the UE may continue measuring the perceived QoE for the flows that are now routed via the WLAN access point/WLAN.

In some example embodiments, if the QoE measured while using the WLAN connectivity at the selected WLAN is relatively worse (or less than expected or a certain threshold) when compared to the QoE measured while using the cellular radio access network, the UE may feedback and thus report back to the network (for example, the RAN, core network, and/or any other node) the QoE performance of the WLAN.

In some example embodiments, the network may, based on the feedback from the UE as well as other reports from UEs, adjust one or more of the selection thresholds used to determine whether a UE should stay coupled to a cellular base station serving the UE or couple to a selected WLAN access point to enable for example offloading and the like. The network may provide the adjusted thresholds to the UE to adapt the thresholds used by the UE when selecting a candidate WLAN access point for offloading and the like.

In some example embodiments, the UE may measure QoE or a statistical realization of the QoE and feedback the QoE to the network to enable WLAN selection threshold adaptation based on the QoE. For example, after a traffic flow that was routed via the cellular base station is moved to a selected WLAN access point, the UE may then compare the change or drift in the QoE caused by WLAN. If the QoE change does not improve (or not as much as expected or preferred) after the access to the selected WLAN access point, the UE may feedback a report to the network, so that the network can determine whether to adapt (for example, adjust and the like) the WLAN selection thresholds. If the network chooses to adjust the selection thresholds, the network may provide the adjusted thresholds to the UE, so that the UE can incorporate the revised thresholds used to stay on a cellular connection or select a WLAN for offload. Because of the adaption, the UE is more likely to select a WLAN for offload that provides relatively better performance from at least a QoE perspective, when compared to the prior, unadjusted thresholds.

Before providing additional examples related to adaptive thresholds for triggering WLAN offloading, the following provides a description of an example of a system, in accordance with some example embodiments.

FIG. 1 depicts a system 100 including a core network 190 which may be coupled via one or more backhaul links/networks to a plurality of base stations, such as base stations 110A-B serving cells 112A-B, and a user equipment 114. The system 100 may also include a WLAN access point 110C serving a WLAN, such as small cell 112C. WLAN access point 110C may also have one or more backhaul links/networks to the network and/or core network 190.

Although FIG. 1 depicts a certain quantity and configuration of devices, other quantities and configurations may be implemented as well. For example, other quantities and configurations of base stations/access points, cells, and user equipment may be implemented as well.

The network may be include a cellular radio access network (RAN) and a core network (CN) 190. The RAN may consist of at least cellular base stations 110A-B that serve cells 112A-B, and WLAN access point 110C may serve cell 112C. The core network 190 may include links to other nodes, such as an access network discovery and selection function (ANDSF) server 192 and the like.

In some example embodiments, UE 114 may be implemented as a mobile device and/or a stationary device. The user equipment 114 may be referred to as, for example, a wireless device, a mobile station, a mobile unit, a subscriber station, a wireless terminal, a tablet, a smart phone, and/or the like. In some example embodiments, UE 114 may be implemented as multi-mode user devices configured to operate using a plurality of radio access technologies, although a single-mode device may be used as well. For example, UE 114 may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies. The user equipment may be located within the coverage area of a cell or multiple cells.

The base stations 110A-B may, in some example embodiments, be configured as an evolved Node B (eNB) type base station, although other types of base stations and wireless access points may be used as well. In the case of eNB type base station, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base stations may also be configured to serve cells using a WLAN technology, such as WiFi (for example, the IEEE 802.11 series of standards), as well as any other radio access technology capable of serving a cell. In the example of FIG. 1, base station/access point 110C may be configured to serve small cell 112C using WiFi, although any other radio access technology may be used as well. The base stations may have wired and/or wireless backhaul links to other networks and/or network nodes including core network 190. Although some of the examples described herein refer to E-UTRAN, other types of networks, such as UTRAN (UMTS Terrestrial Radio Access Network), GERAN (GSM EDGE Radio Access network), WCDMA (Wideband Code Division Multiple Access), HSPA (High Speed Packet Access), and/or any other type of radio network (in which case, the types of thresholds used for network selection may be changed to correspond to the radio network being used). Moreover, the heterogeneous networks may include one or more different cell sizes and/or one or more different cell layers. The radio technologies in the cells and/or layers may be the same or different. Furthermore, the WLANs may belong to a hetnet deployment a proprietary interface or a standard to a core network of the cellular network and/or the cellular radio access networks. In addition, the WLAN may offer access point name level selection for a user equipment, either from a gateway of an Internet service provider or from a gateway of a cellular operator.

UE 114 may be monitoring or measuring QoE while accessing and thus using the cellular radio access network at base station 110A and cell 112A. The QoE may include monitoring (for example, measuring and the like) one or more of the following: packet delays, jitter, throughput, packet losses, information about one or more requirements of an application being executed at UE 114 Moreover, the UE, while monitoring the QoE via the cellular RAN base station 110A, may also look for available WLANs (for example, access point 110C at small cell 112C) and evaluate the likely performance at available WLANs. For example, UE 114 may measure the QoE of the ongoing connection via base station 110A, and measure aspects of available WLANs, such as WLAN access point 110C. The QoE via the base station may take into account one or more portions of the connection (for example, an end-to-end QoE and/or a one or more portions thereof). The measurements may be compared to one or more corresponding thresholds (which may be provided by the network or specified in other ways as well) to determine whether to select a WLAN, such as WLAN access point 110C.

Table 1 below depicts an example of threshold parameters, which can be used as criteria in flow routing definitions. The thresholds parameters at Table 1 may correspond to parameters that can impact QoE over cellular, such as RSRP, RSRQ, CQI (channel quality indicator) and the like, while the other parameters may correspond to parameters that can impact QoE over WLAN. In the example of Table 1, each of the listed parameters may have a corresponding threshold to enable a decision regarding whether to stay on a cellular connection and/or whether to select a WLAN.

TABLE 1

Selection thresholds

RSRP
RSRQ

TABLE 1-continued

Selection thresholds

CQI
WLAN RSSI (received signal strength indicator)
WLAN RCPI (received channel power indicator)
WLAN RSNI (received signal to noise plus interference indicator)
WLAN load To illustrate, in the WLAN case the RSNI may be used as an estimate of a physical bit rate that a user equipment can use in communication with an access point. The WLAN load may be used as an estimate of how much interference a user equipment can experience from other user equipment and, as such, the quantity of resources the user equipment should obtain. These and other parameters may be used by the user equipment to estimate the overall throughput and, in some cases, packet delays when operating at a given WLAN, as well as an estimate of the expected QoE at the given WLAN.

In some example embodiments, if the QoE in the WLAN deteriorates and is worse than what was previously achieved using cellular access (or the QoE improvement does not meet the expectations), the UE may, as noted, send information about the unsatisfactory performance to the network. This kind of event report may be transmitted while connected to the WLAN or at other times as well. The network, such as the RAN or CN, may need to be able to determine which threshold parameters were in use at the UE at the time when the UE transitioned to the WLAN. As such, the UE's feedback regarding the QoE of the WLAN may include the thresholds used, an identifier for the thresholds, a time stamp for the thresholds, and/or a link to the thresholds. In the case of a link, the link may be an index of the threshold provided to the UE for WLAN selection. The UE's event report to the network may also include or indicate information about the conditions in the WLAN connection being reported, such as signal strength, signal quality, base station/access point load, and/or WAN metrics. In some example embodiments, the network may provide the thresholds via an ANDSF server (for example, via ANDSF management objects), although other network nodes may send the thresholds to the UE and may send them in other formats as well.

In some example embodiments, a measurement object may be used to send the thresholds used when measuring the cellular and WLAN for QoE. For example, the management object may include one or more information elements having predetermined values corresponding to the thresholds. The management object may include the threshold value itself or an index to the threshold value. If the UE knows the reason for a non-expected QoE, it can directly point to a certain threshold and the threshold value that UE sees causing the problem for the RAN to modify. For example, if the UE determines that the WLAN load threshold might be too low, the UE may report back the WLAN load threshold to the network to enable the network to adapt that threshold. However, if the UE does not determine that a certain threshold was the cause of the poor QoE at the WLAN, the UE may report back accordingly (for example, reporting back all of the thresholds for possible adjustment by the network). The actual QoE measurement object may include one of several measures like throughput delay, or their variations or just a single measure if it describes the problem discovered with the QoE. The report back to the network may also provide information regarding the service experienced at the WLAN.

Table 2 depicts an example QoE measurement object, which may, in some example embodiments, be an ANDSF measurement object. The UE may use the measurement object at Table 2 to provide feedback to network, such as the RAN and/or CN, and this feedback may report or indicate the QoE before the flow was rerouted to the selected WLAN, difference in the QoE after the selected WLAN was used for the flow, and/or the QoE on the WLAN. This management object may thus provide information regarding the selection threshold parameters used to select the WLAN access point, such as access point 110C.

| QoE object | | | |
| --- | --- | --- | --- |
| Cell index | | | |
| WLAN id | | | |
| Time stamp | | | |
| | Cellular | WLAN | Gain |
| Throughput | | | |
| Throughput variation | | | |
| Delay | | | |
| Delay variation | | | |

Once the QoE information is reported by the UE to the network, the network may use the reported information to, as noted, adjust the thresholds representative of criteria for selection of a WLAN access point (and thus a transition from a cellular access pint to the WLAN access point). The network may select which threshold to adjust, either the selection threshold or the routing decision, or both. The network may compare this information to adjust the thresholds and selection criteria for a single UE, or it may tune the thresholds and selection criteria per flow type or it may change these for a population of UEs, belonging to for example a given subscriber class (or level of service) or evenly across a plurality of UEs.

Figure 2A:
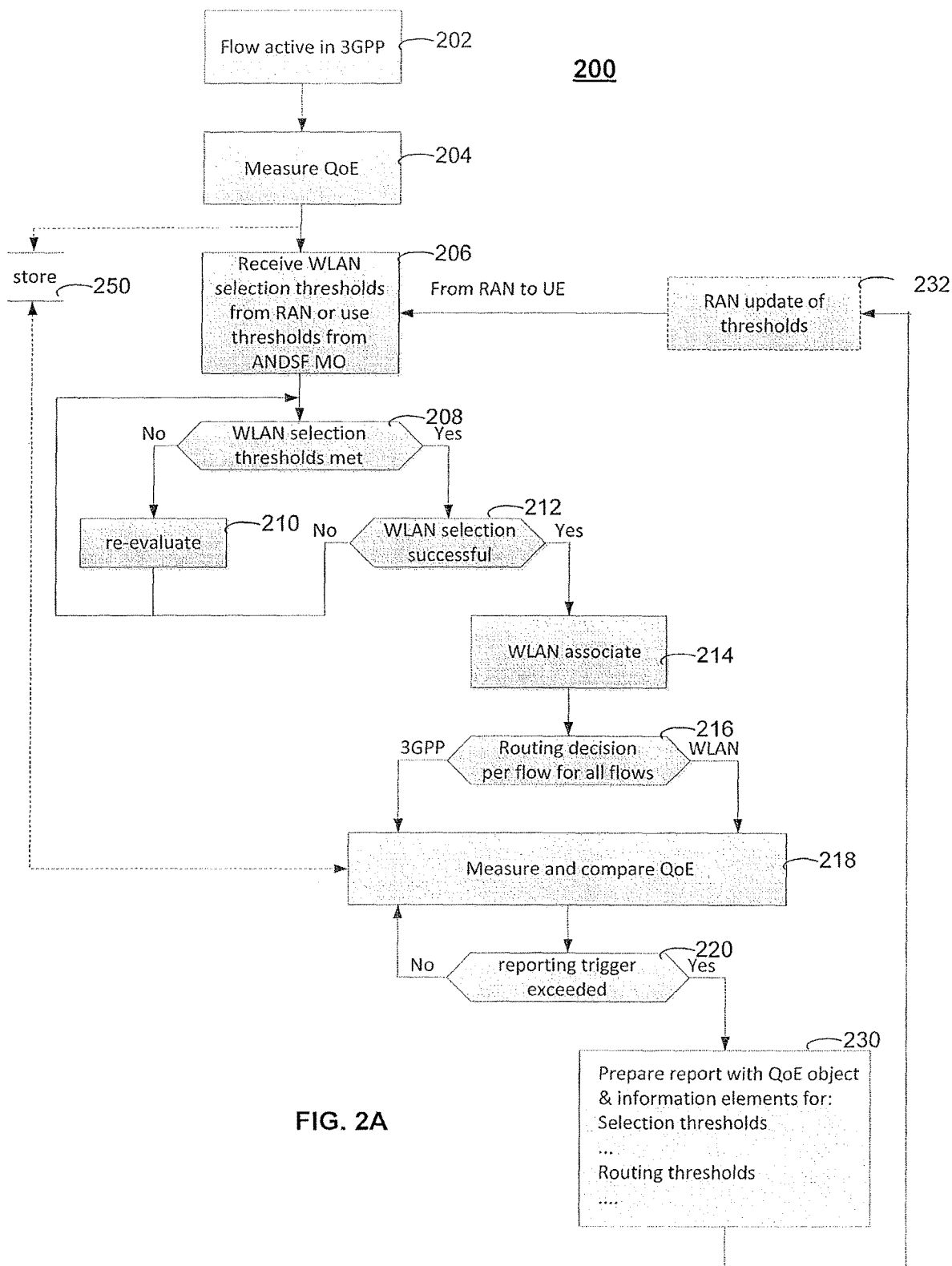
FIG. 2A depicts an example of a process 200 for adjusting WLAN selection thresholds, in accordance with some example embodiments.

FIG. 2A depicts an example process 200 for adaptive thresholds for WLAN selection, in accordance with some example embodiments. The description of process 200 also refers to FIG. 1.

At 202, UE 114 may be served by a cellular base station, such as base station 110A. While at base station 110A, the UE 114 may make one or more measurements to determine a QoE for the cellular access. At 206, the UE may receive measurement information including WLAN selection thresholds, which may be received from base station 110A and/or from the ANDSF server. The UE 114 may make measurements of candidate WLANs and compare the measurements to the received thresholds, so if the thresholds are satisfied the UE may select a WLAN (yes at 208 and 212). If the thresholds are not satisfied, the UE may continue evaluating candidate WLANs (no at 208 and 210). At 214, the UE 114 may associate, at 214, itself (and thus connect to) the selected WLAN, such as access point 110C. At 216, routing decisions may be made to move some if not all of the flows from the cellular to WLAN access. Once a UE is associated to a WLAN access point, the UE may not automatically start using the WLAN for any of the services/ flows. Instead, the UE may, in some example embodiments, determine whether to offload some (if not all) of the flows to the WLAN.

At 218, the UE 114 may evaluate the QoE of the WLAN, and if the WLAN QoE is less than expected (that is not an improvement of the cellular or less than an expected improvement), the UE may report to the network the WLAN selection criteria (yes at 220 and 230). In some example embodiments, QoE may represent an event to trigger reporting. For example, the UE may learn to adapt its QoE event. The QoE event may be able to directly impact network reporting of the WLAN thresholds, and/or the QoE event may be used in combination with signal threshold triggering events to trigger reporting to the network. Moreover, the QoE event reporting may be specified in a standard, although the QoE event may be defined in a proprietary way as well. The network may at 232 provide adjusted thresholds for UE selection. If WLAN QoE is as expected (that is an improvement of the cellular or an expected improvement), the UE may continue to evaluate the WLAN QoE (no at 220 and 218).

At 250, the UE may store the QoE measurements, in accordance with some example embodiments. For example, the UE may maintain knowledge about perceived QoE over a cellular network, so that the UE can compare the cellular QoE to the perceived QoE determined for a WLAN.

Figure 2B:
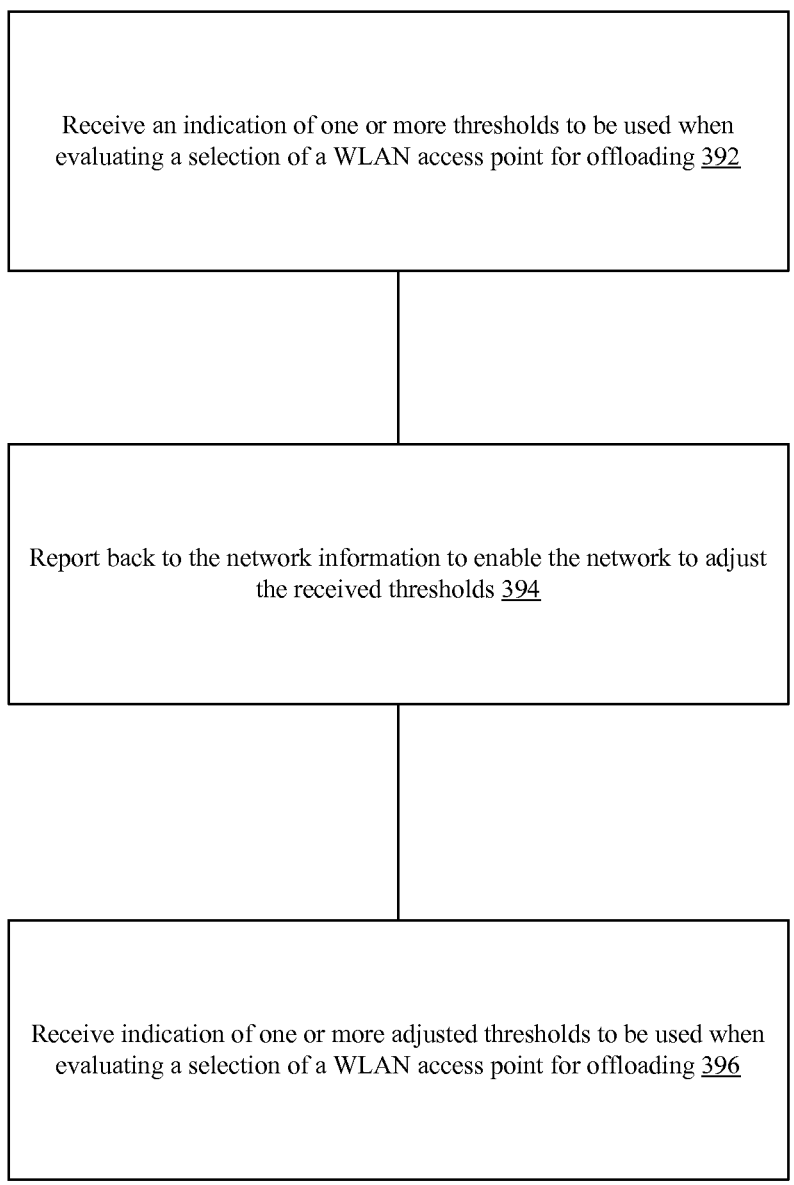
FIG. 2B depicts another example of a process 299 for adjusting WLAN selection thresholds, in accordance with some example embodiments.

FIG. 2B depicts an example process 299 for adaptive thresholds for WLAN selection, in accordance with some example embodiments. The description of process 200 also refers to FIG. 1.

At 392, a UE 114 may receive an indication of one or more thresholds to be used when evaluating a selection of a WLAN access point for offloading, in accordance with some example embodiments. For example, UE 114 may receive from the network (for example, base station 110A, ANDSF server, and/or any other node) measurement information including one or more thresholds which can be used by the UE to decide whether to select a WLAN for offloading. These thresholds may relate to QoE. The measurements may be actual measurements, estimates, and/or evaluations of one or more parameters. Alternatively or additionally, UE 114 may receive an indication of one or more thresholds to be used when evaluating a routing via a WLAN access point, in accordance with some example embodiments.

At 394, the UE may report back to the network information to enable the network to adjust the thresholds received at 392. For example, if the UE determines that the QoE on the WLAN is not satisfactory (for example, the QoE does not offer an improvement over the cellular connection or not the expected improvement), UE 114 may report to the network that the thresholds yielded an unsatisfactory WLAN selection.

At 396, the UE may receive an indication of one or more adjusted thresholds to be used when evaluating a selection of a WLAN access point for offloading, in accordance with some example embodiments. For example, if the network chooses to adjust the WLAN selection thresholds, the network may send the adjusted thresholds to the UE. Alternatively or additionally, UE 114 may receive an indication of one or more adjusted thresholds to be used when evaluating a routing via a WLAN access point, in accordance with some example embodiments.

Figure 3:
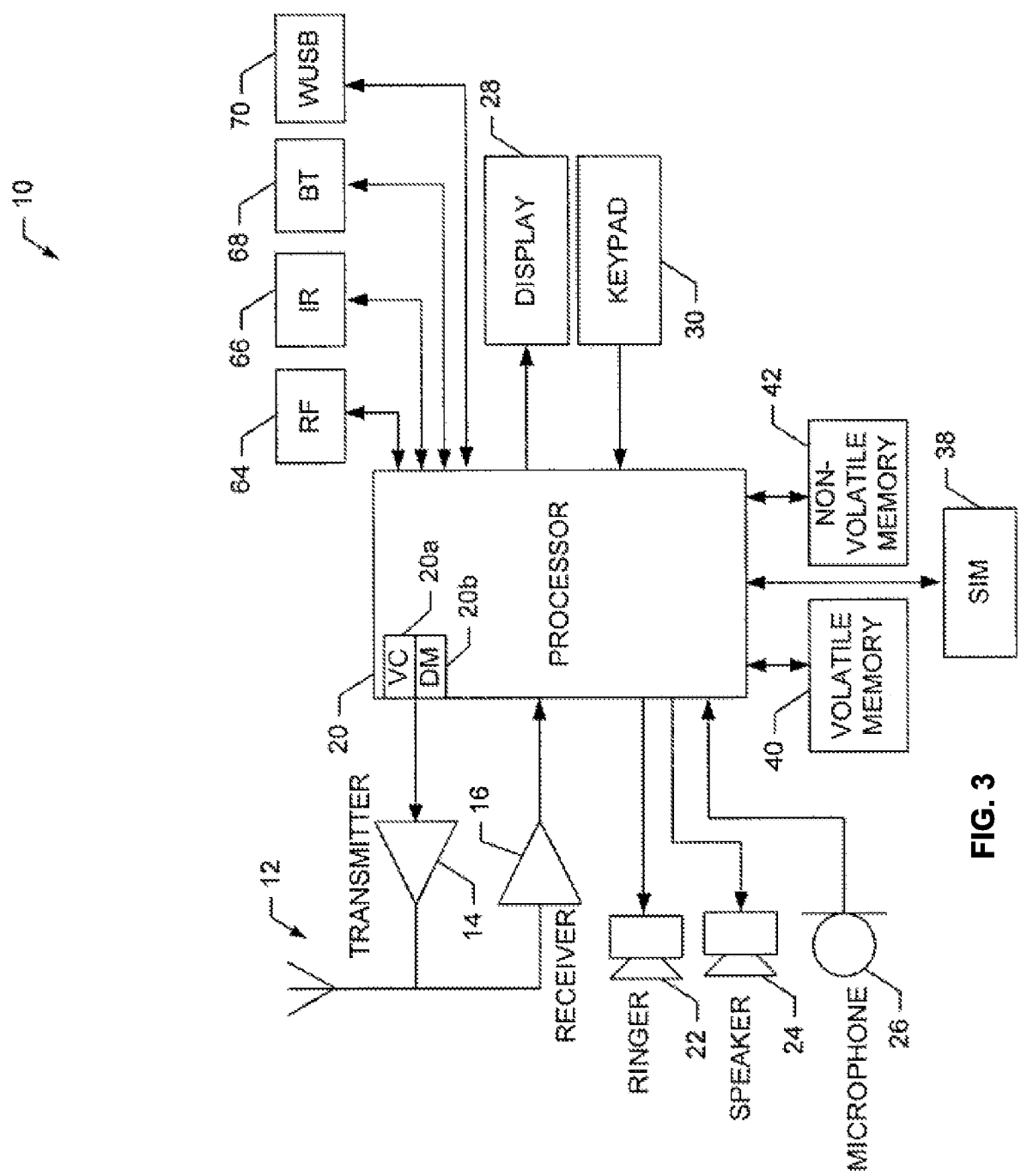
FIG. 3 depicts an example of a user equipment, in accordance with some example embodiments.

FIG. 3 illustrates a block diagram of an apparatus 10, in accordance with some example embodiments. The apparatus 10 (or portions thereof) may be configured to provide a user equipment, a communicator, a machine type communication device, a wireless device, a wearable device, a smartphone, a cellular phone, a wireless sensor/device (for example, a wireless device which is part of a distributed architecture in for example, a car, a vehicle, a robot, a human, and/or the like). In the in case of the distributed architecture, the wireless device may communicate via one or more transceiver modules and/or via a hub that may hide the actual distribution of functionalities from the network.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations, such as processes 200 and/or 299 and/or any other operations/functions disclosed herein. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the 200 and/or 299.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer.

Figure 4A:
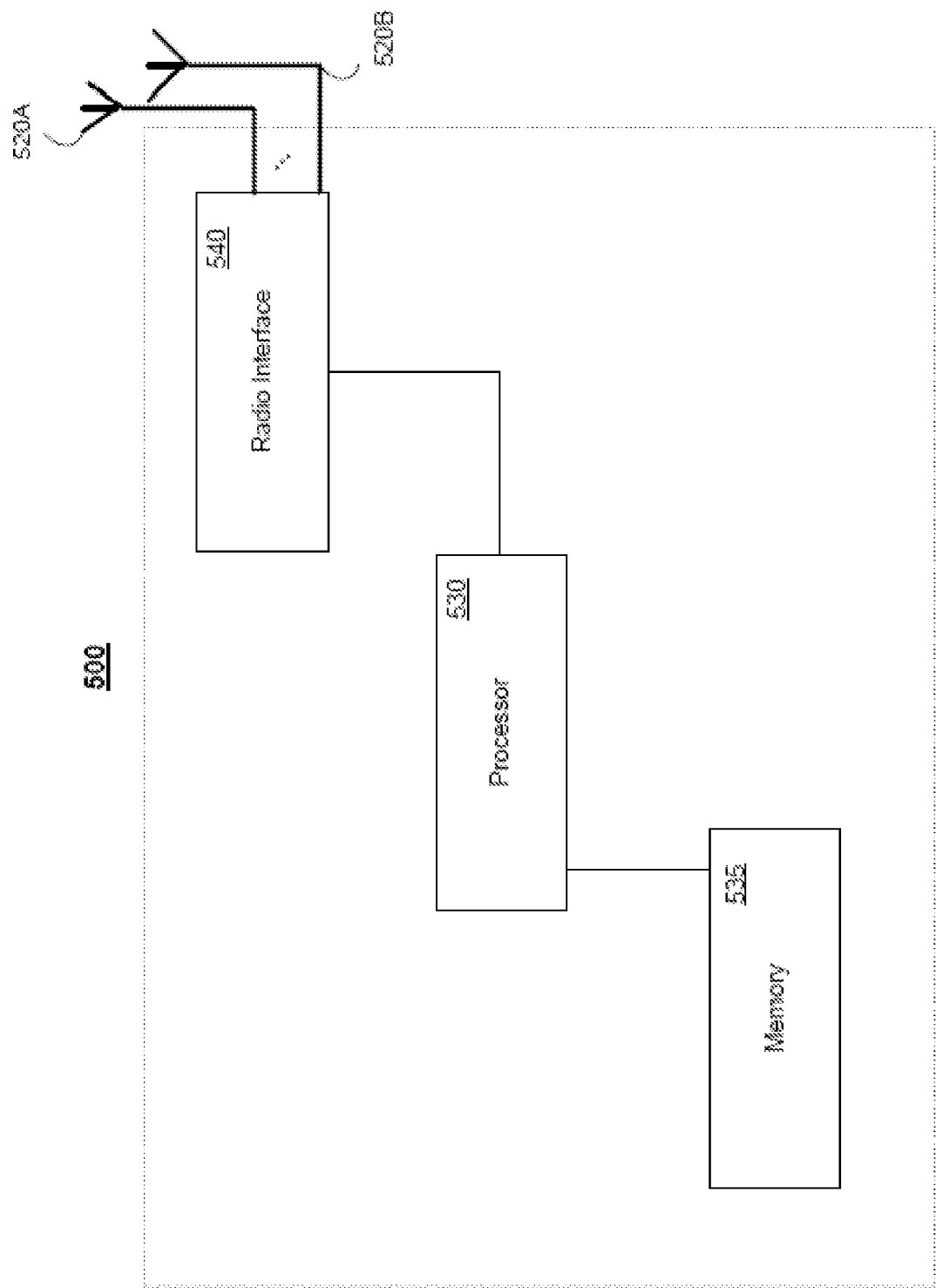
FIG. 4A depicts an example of a network node, in accordance with some example embodiments.

FIG. 4A depicts an example implementation of a wireless access point 500, which may be implemented at for example base station 110A, B, or C in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to a network node.

Figure 4B:
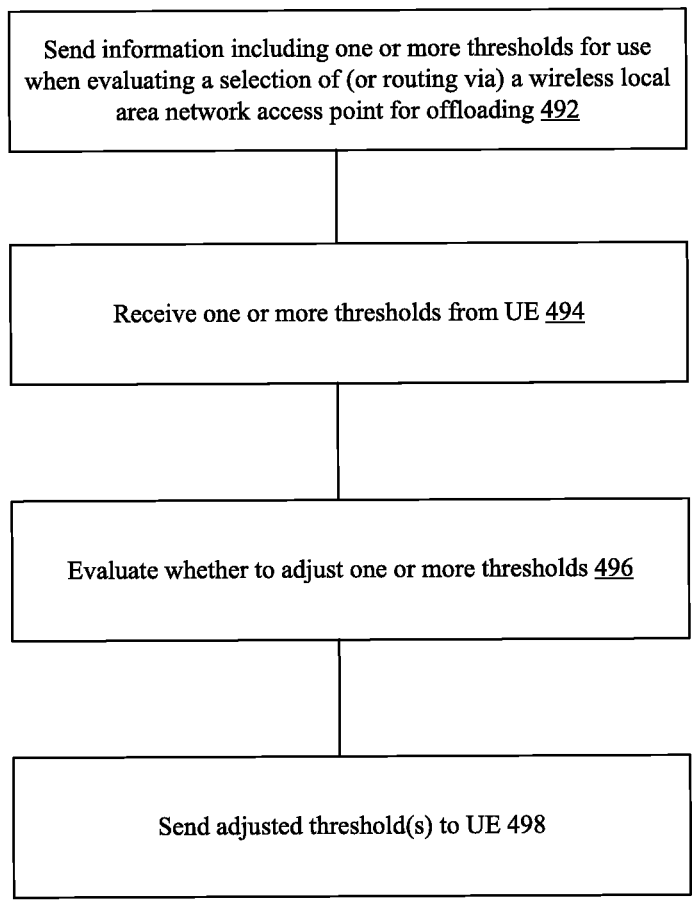
FIG. 4B depicts an example of a process 499 for WLAN selection threshold adjustment, in accordance with some example embodiments.

FIG. 4B depicts an example process 499 for WLAN selection threshold adjustment, in accordance with some example embodiments. At 492, a network node, such as a base station, an access point, and/or any other wireless device, may send to a user equipment information including one or more thresholds for use when evaluating a selection of a wireless local area network access point for offloading. Alternatively or additionally, a network node, such as a base station, an access point, and/or any other wireless device, may, at 492, send to a user equipment information including one or more thresholds for use when evaluating a routing via a wireless local area network access point. The network node may also receive, at 494, as feedback one or more thresholds used by the UE for the selection of a selected wireless local area network access point). Alternatively or additionally, the network node may also receive, at 494, as feedback one or more thresholds used by the UE for routing via a selected wireless local area network access point. The one or more thresholds may be sent to the network node, when the QoE of the selected wireless local area network access point is less than expected (for example, less than a threshold improvement over a predetermined QoE, such as the QoE provided by a cellular access point). The network may, at 496, evaluate, based on the received threshold, the QoE and/or whether to adjust the one or more thresholds used for wireless local area network access point. The network node may, at 498, send to the UE the adjusted thresholds for use by a UE when evaluating wireless local area network access point selection (or routing).

Without in any way limiting the scope, interpretation, or application of the claims appearing below, a technical effect of one or more of the example embodiments disclosed herein is enhanced selection of WLAN access points.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method, comprising:
    receiving, at a user equipment, information including one or more thresholds for use when evaluating a selection of a wireless local area network access point for offloading;
    comparing, by the user equipment, a quality of an access provided by the wireless local area network access point selected in accordance with the one or more thresholds to another quality provided by a cellular access point;
    reporting, by the user equipment and in response to a result of comparing indicating the quality of access provided by the wireless local area network access point is less than the other quality provided by the cellular access point, the result of the comparing; and
    receiving, by the user equipment in response to the reporting, additional information including one or more adjusted thresholds for use when evaluating wireless local area network access point selection.

2. The method of claim 1, wherein the quality represents a first quality of experience for one or more flows when carried via the wireless local area network access point, and wherein the other quality represents a second quality of experience for the one or more flows when carried by the cellular access point.

3. The method of claim 2, wherein the first quality of experience and the second quality of experience each represent at least one of a packet delay, a jitter, a throughput, or a packet loss.

4. The method of claim 2, wherein the first quality of experience and the second quality of experience are determined on a per flow basis.

5. The method of claim 1, wherein the result indicates the quality is less than an expected quality of experience threshold improvement over the other quality.

6. The method of claim 1, wherein the result includes at least one of the received thresholds causing the quality to be less than an expected quality of experience threshold improvement over the other quality.

7. The method of claim 1, wherein the one or more thresholds are received via an access network discovery and selection function management object.

8. An apparatus, comprising:
    at least one processor; and
    at least one memory including computer program code, the at least one memory and the computer program code configured to, with the at least one processor, cause the apparatus to perform at least the following:
    receive information including one or more thresholds for use when evaluating a selection of a wireless local area network access point for offloading;
    compare a quality of an access provided by the wireless local area network access point selected in accordance with the one or more thresholds to another quality provided by a cellular access point;
    report, in response to a result of comparing indicating the quality of access provided by the wireless local area network access point is less than the other quality provided by the cellular access point, the result of the compare; and
    receive, in response to the report, additional information including one or more adjusted thresholds for use when evaluating wireless local area network access point selection.

9. The apparatus of claim 8, wherein the quality represents a first quality of experience for one or more flows when carried via the wireless local area network access point, and wherein the other quality represents a second quality of experience for the one or more flows when carried by the cellular access point.

10. The apparatus of claim 9, wherein the first quality of experience and the second quality of experience each represent at least one of a packet delay, a jitter, a throughput, or a packet loss.

11. The apparatus of claim 9, wherein the first quality of experience and the second quality of experience are determined on a per flow basis.

12. The apparatus of claim 8, wherein the result indicates the quality is less than an expected quality of experience threshold improvement over the other quality.

13. The apparatus of claim 8, wherein the result includes at least one of the received thresholds causing the quality to be less than an expected quality of experience threshold improvement over the other quality.

14. The apparatus of claim 8, wherein the one or more thresholds are received via an access network discovery and selection function management object.

15. An apparatus comprising:
    at least one processor; and at least one memory including computer program code, the at least one memory and the computer program code configured to, with the at least one processor, cause the apparatus to perform at least the following:

send information including one or more thresholds for use by a user equipment when evaluating a selection of a wireless local area network access point for offloading;

receive one or more feedback thresholds, when a quality of experience of an access provided by the wireless local area network access point selected in accordance with the one or more thresholds is less than an expected quality of experience threshold improvement over another quality of experience provided by a cellular access point; and send, in response to the receive, additional information including one or more adjusted thresholds for use when evaluating wireless local area network access point selection.

16. The apparatus of claim 15, wherein the quality of experience and the other quality of experience each represent at least one of a packet delay, a jitter, a throughput, or a packet loss.

17. The apparatus of claim 15, wherein the information including one or more thresholds is sent via an access network discovery and selection function management object.

* * * * *